United States Patent [19]

Buerge et al.

[11] Patent Number: 5,605,571
[45] Date of Patent: Feb. 25, 1997

[54] SETTING- AND HARDENING-ACCELERATOR CONTAINING NO CHLORIDE AND NITRITE AND A METHOD TO ACCELERATE THE SETTING AND HARDENING OF HYDRAULIC BINDERS AND MIXTURES THEREOF

[75] Inventors: Theodor A. Buerge, Geroldswil; Urs Maeder, Frauenfeld; Franz Wombacher, Oberwil-Lieli; Beat Marazzani, Zürich, all of Switzerland

[73] Assignee: Sika Ag, vorm. Kaspar Winkler & Co., Switzerland

[21] Appl. No.: 397,565

[22] Filed: Mar. 2, 1995

[30] Foreign Application Priority Data

Mar. 3, 1994 [CH] Switzerland ................ 624/94

[51] Int. Cl.⁶ ................ C04B 24/00; C04B 24/04
[52] U.S. Cl. ................ 106/808; 106/725; 106/727; 106/728; 106/809; 106/810; 106/823; 106/287.25
[58] Field of Search ................ 106/725, 727, 106/728, 802, 808, 809, 810, 819, 823, 287.25

[56] References Cited

U.S. PATENT DOCUMENTS

| | | | |
|---|---|---|---|
| 4,256,500 | 3/1981 | Turpin, Jr. | 106/709 |
| 4,264,367 | 4/1981 | Schulz | 106/728 |
| 4,473,405 | 9/1984 | Gerber | 106/727 |

FOREIGN PATENT DOCUMENTS

| | | |
|---|---|---|
| 0558336 | 9/1993 | European Pat. Off. . |
| 2280600 | 2/1976 | France . |
| WO86/02921 | 5/1986 | WIPO . |

OTHER PUBLICATIONS

Chemical Abstracts, vol. 105, No. 8, Abstract No. 65291b, Aug. 25, 1986.

*Primary Examiner*—Mark L. Bell
*Assistant Examiner*—Michael Marcheschi
*Attorney, Agent, or Firm*—Burns, Doane, Swecker & Mathis, L.L.P.

[57] ABSTRACT

The invention relates to a setting- and hardening-accelerator for hydraulic binders containing at least a nitrate- or sulfite component, at least a thio-cyanate component, at least an alkanolamine component and at least a carboxylic acid component, as well as a method of setting- and hardening-acceleration of hydraulic binders or mixtures containing hydraulic binders.

32 Claims, No Drawings

SETTING- AND HARDENING-ACCELERATOR CONTAINING NO CHLORIDE AND NITRITE AND A METHOD TO ACCELERATE THE SETTING AND HARDENING OF HYDRAULIC BINDERS AND MIXTURES THEREOF

BACKGROUND OF THE INVENTION

The present invention relates to a setting and hardening-accelerator devoid of chloride and nitrite, containing nitrate or sulfite, thiocyanate, alkanolamine and carboxylic acid or respective derivatives and a method to accelerate the setting of binders like cement, cement mixtures, pozzolana cement and of mortar produced thereof and concrete by means of this kind of accelerator. The applications of this setting-accelerator and its respective method are dealing with the manufacture of prefabricated elements and acceleration of the manufacture of concrete on the construction site. In the first case, the usual hardening-acceleration can be diminished or even eliminated through heat (electric- or fuel-heating or through vapor). In the second case the deforming periods for concrete can be reduced or working with concrete at low temperatures is possible. Applications result also from the manufacture of rapidly setting mixtures of cement and mortar, particularly to settle ready-to-use parts, castings etc.

DESCRIPTION OF THE INVENTION

A variety of substances that accelerate the setting and hardening of concrete are already known. The most conventional are e.g. nitrate, formate, thiocyanate, nitrite, mono-, di- and triethanolamine, highly alkaline agents like alkali hydroxide, alkali carbonate, alkali silicate, alkali aluminate as well as alkaline earth metal chlorides. Concerning the highly alkaline agents undesired inconveniences to the treating personnel do occur.

From a concrete technology point of view, highly alkaline setting-accelerators reduce the final strength, increase the shrinking that is leading to fissures and can jeopardize the durability of a building.

Setting-agents containing chlorides are generally not desired on a building site, because they can lead to corrosion on the steel reinforcement bars within the concrete, as well as to the construction equipment.

Furthermore it is known, that setting-agents containing chlorides reduce substantially the chemical resistance, above all the sulfate-resistance of concrete.

Nitrate has been known for a long time for being an "anti-freeze", i.e. it causes an acceleration of setting at low temperatures. However at room-temperature the effect of nitrate is insignificant. (see for example: U.S. Pat. No. 4,337,094, Tokan).

Calcium formate has already been described in 1977 (DE 2 611 419) as a hardening-accelerator for portland-cement, but its effect is considerably below that of $CaCl_2$. Moreover it shows no sufficient solubility in water.

A very good setting-accelerator is $Ca[NO_2]_2$, but its application is inconceivable in Europe because of its considerable toxicity in the concentrations that are necessary (USSR 563 392, 1977).

The combination of a thiocyanate and an alkanolamine increases according to U.S. Pat. No. 4,373,956 (Rosskopf) the speed of hardening as well as the compressive strength of cementitous products.

Several organic setting-accelerators have been described, but only a few of them are of any significance on the market. Thus mono-, di- and triethanolamine in combination with nitrates at low temperatures have an accelerating effect on the setting of cement, and EP 0 558 336 discloses the use of conventional accelerators, particularly of $Ca(NO_3)_2$ in combination with amino acids or aminosulfonic acid derivatives respectively.

A combination of triethanolamine with aluminium sulfate increases according to U.S. Pat. No. 3,782,991 (Bürge) the early strength of construction materials.

The aptitude of alpha-hydroxycarboxyl compounds as setting-agents for portland cement has been patented in 1981 by Schutz (Sika, U.S. Pat. No. 4,264,367). U.S. Pat. No. 4,473,405 (Gerber) describes an accelerator from a nitrate, an alkanolamine and a thiocyanate, and WO-A 86 02921 discloses further the addition of poly(n-methylal)glycoluril.

The corrosion-inhibiting effect of alkanol-amines on steel has been described for example in U.S. Pat. No. 4,726,914. Conventional and/or the above-mentioned accelerators display all one or a couple of drawbacks. They work only at low temperatures, not at room temperature, they increase the initial strength, reduce however the final strength compared to a corresponding sample without admixture, they reduce the workability time or they are toxic or corrosive.

DESCRIPTION OF THE FIELD OF THE INVENTION

The objective of the present invention was therefore to provide a setting- and hardening-accelerator containing no chloride and nitrite, having not or only to a sharply diminished extent the above-mentioned drawbacks.

Surprisingly it has now been found, that according to the invention, with the unique combination of 4 components, accelerators could be produced, which provide high initial and final strength at extremely long working time of the concrete or mortar mixtures.

The combinations according to the invention do not only accelerate at low temperature, but also at room temperature, as well as at warm climate (up to 35° C.).

Further technical advantages are the absence of chloride and nitrite, as well as the fact, that the mixtures, owing to the addition of the alkanolamine are not corrosive to the steel of the reinforcement bars of concrete.

The setting- and hardening-accelerators according to the invention are preferably entirely or partially composed of (1) at least one alkali, alkaline earth metal or ammonium thiocyanate, (2) at least one alkanol amine, (3) at least one alpha-hydroxy- or alpha-aminocarboxylic acid or the alkali, alkaline earth metal- or ammonium salts thereof and (4) at least one nitrate and/or sulfite component, particularly alkali, alkaline earth metal- or ammonium nitrate and/or a sulfite.

The alkanolamine can either be used as a salt or an organic or inorganic acid or a mixture thereof. As organic acids, acetic acid and formic acid or the carboxylic acid component, particularly alpha-hydroxycarboxylic acid and alpha-aminocarboxylic acid are suitable. As inorganic acids, sulphuric acid and boric acid or nitric acid respectively, providing a quantitative share of the nitrate component, are suitable. Preferably, a maximum of 50% of the alkanolamine consists of mono-, di- or triethanolamine or a mixture thereof. The carboxylic acid component can be an alpha-hydroxy monocarboxylic acid or an alpha-amino carboxylic acid, or their alkali, alkaline earth metal, or ammonium salts, or their corresponding $C_1$–$C_{14}$-alkyl estheres, or a mixture thereof.

The accelerator may contain at least one thiocyanate component in a quantity of 1–20%, at least one alkanolamine component in a quantity of 1–35%, at least one carboxylic acid component in a quantity of 1–25%, as well as least one nitrate- and/or sulfite component in a quantity of 1–40%.

Thiocyanate components according to the invention include Na-thiocyanate and Ca-thiocyanate.

Alkanolamine components according to the invention include tris(hydroxymethyl)aminomethane; diisopropanolamine; N-methyldiethanolamine; 2-amino-2-methyl-1,3-propandiol; N,N,N',N'-tetrakis-(2-hydroxypropyl)-ethylenediamine; N-butyldiethanolamine; monoisopropanolamine; triisopropanolamine; and 2-amino-2-methyl-1-propanol.

Carboxylic acid components according to the invention include lactic acid (an alpha-hydroxy monocarboxylic acid), mandelic acid (an alpha-hydroxy monocarboxylic acid), and D,L-aspartic acid (an alpha-amino carboxylic acid).

Nitrate components according to the invention include Na-nitrate and Ca-nitrate.

Sulfite components according to the invention include Na-sulfite and Na-pyrosulfite.

The accelerator according to the invention may be in the form of a powder, dispersed in water or in a non-aqueous solvent, or dissolved in water.

The compositions according to the invention are suitable to accelerate the setting and hardening of a hydraulic binder, like cement, in pure form or as a mixture with latent hydraulic binders like fly-ash, blast furnace slag, burnt oil shale or silica fume, as well as mortar and concrete manufactured therefrom.

The accelerators according to the invention can be applied as powder, dissolved in water or in combination with other concrete admixtures, like high-range water-reducers, water-reducers, silica slurries, dispersion agents and/or further setting-accelerators. The additives can be added to the cement as a solid or dissolved, and they can be added, to the dry mixture or to the concrete or mortar ready-mix.

Of course they also can be admixed during the manufacture of the binder or the premanufactured dry mortar, prior to the application at the construction. The setting and hardening accelerator of the invention may be used to accelerate the setting and hardening of a hydraulic binder in pure form or as a mixture with latent hydraulic binders, as well as mortars and concrete produced therefrom. Preferably, 0.2 to 5.0 weight %, on the basis of the weight of the binder, of the setting and hardening accelerator is added to the hydraulic binder. The setting and hardening accelerator may be added to a dry binder, to a water prepared binder, or to mortar or concrete. The addition may be done in a manufacturing plant, on the construction site, in a mixer, in a feeding pump, or through a static mixer with a dosage apparatus for powders or a dosage apparatus for liquids. Preferably, the setting and hardening accelerator is added as a powder in pre-mixed form to a hydraulic binder, dry mortar or dry concrete. The setting and hardening accelerator is also preferably introduced into a hydraulic binder during production of the binder in a manufacturing plant.

A further binder, such as water-glass, aluminate, calcium sulfoaluminate or the like, as a liquid or as a powder may be introduced to a concrete mix prior to addition of the setting and hardening accelerator. The further binder may be introduced into the concrete mix via a mixer, a feeding-pump or through a static mixer by means of a dosage apparatus for powders or liquids.

The following examples illustrate the invention:

EXAMPLES

In the following examples the influence of the single components of an accelerator according to the invention will be illustrated. The test-mixtures are composed as follows:

| Mixture A | | Mixture B | |
| --- | --- | --- | --- |
| Portland-cement type I | 1000 kg | Portland-cement type I | 1000 kg |
| Sand 0–5 mm | 3000 kg | Sand 0–5 mm | 3000 kg |
| Water | 0.395 kg | Water | 0.465 kg |
| High-range water-reducer | 0.010 kg | High-range water-reducer | 0.015 kg |
| Accelerator | 0.015 kg | | |

Prismatic test-objects of 4×4×16 cm size have been produced from these mixtures and the compressive strength was determined therefrom.

EXAMPLE 1

This example shows the effect on the final strength of an alpha-hydroxycarboxylic acid that can be used in an accelerator according to the invention.

| Mixture A | |
| --- | --- |
| Admixture | Compressive strength 28 days |
| Test-sample (without accelerator) | 55 N/mm$^2$ |
| Accelerator 1 (containing 14% THPED in water) | 52 N/mm$^2$ |
| Accelerator 1 (containing additionally 20% lactic acid) | 59 N/mm$^2$ |

THPED = N,N,N'N'-tetrakis-(2-hydroxypropryl)-ethylenediamine

EXAMPLE 2

Example to illustrate the influence of a thiocyanate

| Mixture A | |
| --- | --- |
| Admixture | Compressive strength 8 hours |
| Test-sample (without accelerator) | 2.0 N/mm$^2$ |
| Accelerator 2 (containing 10% TRIS, 4% sodium pyrosulfite and 6% lactic acid) | 2.2 N/mm$^2$ |
| Accelerator 2 (containing additionally 10% sodium thiocyanate) | 4.1 N/mm$^2$ |

TRIS = tris-(hydroxymethyl)-aminomethane

EXAMPLE 3

An example to illustrate the influence of an alkanolamine that can be used in an accelerator according to the invention.

| Mixture B | |
|---|---|
| Admixture | Compressive strength 1 day |
| Test-sample (without accelerator) | 24 N/mm$^2$ |
| Accelerator 3 (containing 10% diethanolamine and 50% lactic acid) | 26 N/mm$^2$ |
| Accelerator 3 (diethanolamine being replaced by N-methyl-diethanolamine) | 32 N/mm$^2$ |

EXAMPLE 4

An example to illustrate the effect of a nitrate that can be used in an accelerator according to the invention. Temperature of assay being 10° C.

| Mixture B | | |
|---|---|---|
| | Compressive strength | |
| Admixture | 1 day | 2 days |
| Test-sample (without accelerator) | 6.4 N/mm$^2$ | 21 N/mm$^2$ |
| Accelerator 4 (containing 10% Tris, 10% sodium thiocyanate and 50% lactic acid) | 9.0 N/mm$^2$ | 24 N/mm$^2$ |
| Accelerator 4 (containing additionally 16% calcium nitrate) | 18.0 N/mm$^2$ | 30 N/mm$^2$ |

TRIS = tris-(hydroxymethyl)aminomethane

In the following examples the effect on the early strength of an accelerator according to the invention in concrete mixtures at different temperatures will be set forth. The mixture was composed as follows:

| Mixture C | |
|---|---|
| Portland cement type I (350 kg/m$^3$) | 9.150 kg |
| Admixtures 0–32 mm (prEN 480-1 (1992)) | 50,000 kg |
| Accelerator | 0.1375 kg |

Cubes of the size 12×12×12 cm have been produced from these mixtures and the compressive strength was determined therefrom.

The accelerator according to the invention used in these mixtures was composed of:

| | |
|---|---|
| Tris-(hydroxymethyl)aminomethane | 10% |
| Lactic acid | 4% |
| Sodium thiocyanate | 10% |
| Calcium nitrate | 16% |
| Water | 60% |

EXAMPLE 5

An example to illustrate the effect of an accelerator according to the invention at 10° C.

| | | Compressive strength | |
|---|---|---|---|
| Admixture | W/C | 1 day | 2 days |
| Test-sample (without accelerator) | 0.490 | 12.2 N/mm$^2$ | 22.4 N/mm$^2$ |
| Commercially available accelerator based on calcium nitrate | 0.475 | 17.3 N/mm$^2$ | 25.8 N/mm$^2$ |
| Accelerator 5 according to the invention | 0.475 | 19.0 N/mm$^2$ | 30.8 N/mm$^2$ |

EXAMPLE 6

An example to illustrate the effect of an accelerator according to the invention at 20° C.

| | | Compressive strength | |
|---|---|---|---|
| Admixture | W/C | 8 h | 1 day |
| Test-sample (without accelerator) | 0.510 | 1.4 N/mm$^2$ | 19.9 N/mm$^2$ |
| Accelerator 5 according to the invention | 0.495 | 3.8 N/mm$^2$ | 29.3 N/mm$^2$ |

EXAMPLE 7

An example to illustrate the effect of an accelerator at 30° C.

| | | Compressive strength | |
|---|---|---|---|
| Admixture | W/C | 8 h | 1 day |
| Test-sample (without accelerator) | 0.500 | 12.5 N/mm$^2$ | 25.7 N/mm$^2$ |
| Commercially available accelerator based on sodium thiocyanate | 0.495 | 13.4 N/mm$^2$ | 28.1 N/mm$^2$ |
| Accelerator 5 according to the invention | 0.510 | 15.0 N/mm$^2$ | 29.0 N/mm$^2$ |

EXAMPLE 8

In this example the difference between an accelerator according to the invention and a commercially available accelerator, based on calcium nitrate and calcium chloride is illustrated. The assays have been carried out at 10° C. The mixture was composed as follows:

| Mixture D | |
|---|---|
| Portland cement type I (300 kg/m$^3$) | 7.850 kg |
| Admixtures 0–32 mm (SIA 162 (1989)) | 50,000 kg |
| High-range water reducer | 0.0785 kg |

| | | | Compressive strength | |
|---|---|---|---|---|
| Admixture | W/W | W/C | 1 day | 2 days |
| Test-sample (without accelerator) | — | 0.460 | 10.5 N/mm$^2$ | 26.7 N/mm$^2$ |
| Commercially available accelerator based on calcium nitrate | 1.0% | 0.470 | 11.3 N/mm$^2$ | 26.0 N/mm$^2$ |
| Aqueous solution of 30% calcium chloride | 6.0 | 0.480 | 12.7 N/mm$^2$ | 22.1 N/mm$^2$ |

| Accelerator 5 according to the invention | 1.5% | 0.475 | 20.1 N/mm² | 33.0 N/mm² |

EXAMPLE 9

In this assay the influence of an accelerator according to the invention with a concentration in the range of 0.5–2% on the setting time is set forth. The setting times have been determined according to SIA 215.001 (1991), being identical with EN 196, part 3 (05.1987) with the Vicar-needle.

| The mixtures were composed of: | |
|---|---|
| Portland cement type I | 300 g |
| Quarz powder | 300 g |
| W/C-value | 0.540 |

An accelerator was used including 10% TRIS, 10% sodium thiocyanate, 4% sodium pyrosulfite and 6% lactic acid.

| Dosage of the accelerator according to the invention | initial setting | final setting |
|---|---|---|
| 0.0% | 180' | 250' |
| 0.5% | 150' | 210' |
| 1.0% | 140' | 190' |
| 1.5% | 120' | 180' |
| 2.0% | 120' | 180' |

EXAMPLE 10

In this example the effect on the early strength of an alpha-hydroxycarboxylic acid that can be used in an accelerator according to the invention with and without high-range water-reducer is set forth.

Mixture: 1000 kg portland cement type I 3000 kg sand 0–4 mm water for constant flow table spread 180 +/_5 mm To these mixtures the below-mentioned substances have been added and prismatic test objects of the size 4×4×16 cm were produced. The proportional strength after 8 h and 24 h are exposed.

| | 8 h | 24 h |
|---|---|---|
| 0-assay | 100 | 100 |
| 0.1% Mdea, 0.15% NaNCS 0.2% NaNO₃ | 176 | 131 |
| + 0.06 lactic acid | 194 | 131 |
| + 0.12 lactic acid | 223 | 137 |
| + 0.18 lactic acid | 217 | 131 |
| 0.06% lactic acid alone | 100 | 100 |
| 0.12% lactic acid alone | 100 | 100 |
| 0.18% lactic acid alone | 94 | 100 |
| with addition of 1% high-range water-reducer | | |
| 0-assay | 100 | 100 |
| 0.1% Mdea, 0.15% NaNCS 0.2% NaNO₃ | 142 | 117 |
| + 0.06 lactic acid | 165 | 114 |
| + 0.12 lactic acid | 185 | 110 |
| + 0.18 lactic acid | 185 | 114 |
| 0.06% lactic acid alone | 97 | 96 |
| 0.12% lactic acid alone | 97 | 93 |
| 0.18% lactic acid alone | 90 | 96 |

As expected, the use of pure lactic acid in the mentioned concentrations doesn't have any or only a retarding influence on the early strength at issue. However it was surprisingly found, that this alpha-hydroxycarboxylic acid in a combination of the accelerator according to the invention together with the present ingredients, exert a synergistic effect concerning the early strength and represents as a result an indispensable component not only concerning the final strength.

What is claimed is:

1. A setting and hardening accelerator which comprises 1–35% of at least one alkanolamine component, 1–20% of at least one thiocyanate component, 1–25% of at least one carboxylic acid component, and 1–40% of at least one component which includes a nitrate, a sulfite or a combination of a nitrate and a sulfite.

2. The accelerator according to claim 1 in which the thiocyanate component is an alkali, alkaline earth metal, ammonium salt, or a mixture thereof.

3. The accelerator according to claim 1 in which the alkanolamine component is a salt of an organic or inorganic acid or a mixture thereof.

4. The accelerator according to claim 3 in which a maximum of 50% of the alkanolamine component consists of mono, di- or triethanolamine or a mixture thereof.

5. The accelerator according to claim 1 in which the carboxylic acid component is selected from the group consisting of an alpha-hydroxy monocarboxylic acid; an alpha-amino carboxylic acid; an alkali, alkaline earth metal, or ammonium-salt of an alpha-hydroxy monocarboxylic acid; an alkali, alkaline earth metal, or ammonium-salt of an alpha-amino carboxylic acid; a $C_1$–$C_4$-alkyl ester of an alpha-hydroxy monocarboxylic acid; a $C_1$–$C_4$-alkyl ester of an alpha-amino carboxylic acid; and mixtures thereof.

6. The accelerator according to claim 1 in which the nitrate is selected from the group consisting of alkali nitrate, alkaline earth metal nitrate, an ammonium salt of nitrate and mixtures thereof, and the sulfite is selected from the group consisting of alkali sulfite, alkaline earth metal sulfite, an ammonium salt of sulfite and mixtures thereof.

7. The accelerator according to claim 1 in which said thiocyanate component comprises Na-thiocyanate.

8. The accelerator according to claim 1 in which said thiocyanate component comprises Ca-thiocyanate.

9. The accelerator according to claim 1 in which said alkanolamine component comprises tris(hydroxymethyl)aminomethane.

10. The accelerator according to claim 1 in which said alkanolamine component comprises diisopropanolamine.

11. The accelerator according to claim 1 in which said alkanolamine component comprises N-methyldiethanolamine.

12. The accelerator according to claim 1 in which said alkanolamine component comprises 2-amino-2-methyl-1,3-propandiol.

13. The accelerator according to claim 1 in which said alkanolamine component comprises N,N,N',N'-tetrakis-(2-hydroxypropyl)-ethylenediamine.

14. The accelerator according to claim 1 in which said alkanolamine component comprises N-butyldiethanolamine.

15. The accelerator according to claim 1 in which said alkanolamine component comprises monoisopropanolamine.

16. The accelerator according to claim 1 in which said alkanolamine component comprises triisopropanolamine.

17. The accelerator according to claim 1 in which said alkanolamine component comprises 2-amino-2-methyl-1-propanol.

18. The accelerator according to claim 1 in which said carboxylic acid component comprises lactic acid.

19. The accelerator according to claim 1 in which said carboxylic acid component comprises mandelic acid.

20. The accelerator according to claim 1 in which said carboxylic acid component comprises D,L-aspartic acid.

21. The accelerator according to claim 1 in which said nitrate component comprises Na-nitrate.

22. The accelerator according to claim 1 in which said nitrate component comprises Ca-nitrate.

23. The accelerator according to claim 1 in which said sulfite component comprises Na-sulfite.

24. The accelerator according to claim 1 in which said sulfite component comprises Na-pyrosulfite.

25. The accelerator according to claim 1 which is a powder, dispersed in water, dispersed in a non-aqueous solvent, or dissolved in water.

26. Method to accelerate the setting and hardening of a hydraulic binder, or of mortars or concrete produced therefrom, comprising adding to a mixture containing said binder, 0.2 to 5.0 weight %, based on the weight of the binder, of a setting and hardening accelerator according to claim 1.

27. Method according to claim 26 in which the accelerator is added to a dry binder, or an aqueous binder, or, mortar or concrete prepared therefrom, wherein the addition occurs in a manufacturing plant, on a construction site, in a mixer, in a feeding-pump or through a static mixer having a dosage apparatus for powders or a dosage apparatus for liquids.

28. Method according to claim 27 in which the setting and hardening accelerator is a powder and is used in a pre-mixed form in hydraulic binders or in dry mortar or concrete.

29. Method according to claim 27 in which the setting and hardening accelerator is introduced during production of the binder in a manufacturing plant.

30. Method according to claim 27 in which prior to the introduction of the setting and hardening accelerator to the binder, a further binder selected from the group consisting of water-glass, aluminate and calcium sulfoaluminate, is added to a concrete mix by means of a mixer, a feeding-pump or through a static mixer having a dosage apparatus for powders or liquids.

31. Method according to claim 27 in which the hydraulic binder is cement.

32. Hydraulic binder pre-mix which comprises the binder and the accelerator according to claim 1.

* * * * *